United States Patent

Norris (10) Patent No.: US 9,004,442 B2
(45) Date of Patent: Apr. 14, 2015

(54) FIXING ELEMENT FOR A CABLE SYSTEM

(75) Inventor: Stephen Norris, Swansea (GB)

(73) Assignee: Hi-Lex Cable System Company Limited, Port Talbot (GB)

( * ) Notice: Subject to any disclaimer, the term of this patent is extended or adjusted under 35 U.S.C. 154(b) by 0 days.

(21) Appl. No.: 13/509,594

(22) PCT Filed: Nov. 10, 2010

(86) PCT No.: PCT/GB2010/051876
§ 371 (c)(1),
(2), (4) Date: Jul. 2, 2012

(87) PCT Pub. No.: WO2011/058356
PCT Pub. Date: May 19, 2011

(65) Prior Publication Data
US 2012/0267507 A1    Oct. 25, 2012

(30) Foreign Application Priority Data

Nov. 11, 2009  (GB) .................................. 0919682.5
Feb. 11, 2010  (GB) .................................. 1002292.9

(51) Int. Cl.
*F16M 13/00*   (2006.01)
*F16C 1/26*    (2006.01)
(Continued)

(52) U.S. Cl.
CPC .................. *F16C 1/265* (2013.01); *F16C 1/105* (2013.01); *F16C 1/108* (2013.01); *F16C 1/262* (2013.01);
(Continued)

(58) Field of Classification Search
USPC ........ 248/562, 564, 570, 638, 68.1, 560, 565, 248/566, 49, 56; 174/65 G, 167, 65 SS, 151, 174/152 R, 153 R, 153 G, 152 G, 70 R; 403/326, 329, 374.1
See application file for complete search history.

(56) References Cited

U.S. PATENT DOCUMENTS 3,666,878 A  *  5/1972  Turner ........................ 174/152 R
3,766,307 A  *  10/1973  Andrews, Jr. .................... 174/47
(Continued)

FOREIGN PATENT DOCUMENTS

EP   0651165   5/1995
EP   1233206   8/2002
(Continued)

OTHER PUBLICATIONS

Great Britain Search Report dated Jul. 5, 2010 for related British Application No. GB1002292.9.
(Continued)

*Primary Examiner* — Monica Millner
(74) *Attorney, Agent, or Firm* — Troutman Sanders LLP; Ryan A. Schneider; Daniel Sharpe (57) ABSTRACT

Vibration is transferred through components that pass from an engine compartment to a passenger cell in a vehicle. One such component is the transmission cable (7). An inner cable provides the mechanical movement between the gear shifter and the gear box, and an outer conduit houses the cable. An abutment attaches this conduit to a body of a vehicle. The present invention provides a fixing element (19) or abutment for securing a conduit for carrying a cable (7) therethrough to a vehicle body, the conduit comprising a first portion and a second portion (37), wherein the fixing element (19) is configured to retain a damper for absorbing vibration in the longitudinal length of the conduit between the first and second conduit portion, at least a portion of the damper being formed of silicon rubber.

22 Claims, 13 Drawing Sheets

(51) Int. Cl.
  *F16C 1/10* (2006.01)
  *F16F 1/36* (2006.01)
  *F16F 1/373* (2006.01)

(52) U.S. Cl.
  CPC ........... *F16C 2240/40* (2013.01); *F16F 1/3605* (2013.01); *F16F 1/373* (2013.01); *F16C 2361/61* (2013.01)

(56) References Cited

U.S. PATENT DOCUMENTS

| | | | | |
|---|---|---|---|---|
| 3,792,217 A * | 2/1974 | McConnell et al. | ............ | 218/70 |
| 4,011,397 A * | 3/1977 | Bouche | ............ | 174/42 |
| 4,112,247 A * | 9/1978 | Dembiak et al. | ............ | 174/16.1 |
| 4,142,064 A * | 2/1979 | Thomsen | ............ | 174/153 G |
| 4,782,919 A * | 11/1988 | Chalaire et al. | ............ | 184/6.11 |
| 5,091,605 A * | 2/1992 | Clifford | ............ | 174/650 |
| 5,347,882 A * | 9/1994 | Klotz | ............ | 74/502.4 |
| 5,383,377 A * | 1/1995 | Boike | ............ | 74/502 |
| 5,448,926 A * | 9/1995 | Reasoner | ............ | 74/500.5 |
| 5,531,134 A * | 7/1996 | Petruccello | ............ | 74/502.4 |
| 5,546,827 A * | 8/1996 | Pospisil | ............ | 74/502.4 |
| 5,553,818 A * | 9/1996 | Wild | ............ | 248/56 |
| 5,564,314 A * | 10/1996 | Gabas | ............ | 74/501.5 R |
| 5,574,815 A * | 11/1996 | Kneeland | ............ | 385/101 |
| 5,575,180 A * | 11/1996 | Simon | ............ | 74/502.4 |
| 5,678,456 A * | 10/1997 | Webb | ............ | 74/502.4 |
| 5,678,866 A * | 10/1997 | Mina | ............ | 174/153 A |
| 5,685,199 A * | 11/1997 | Malone | ............ | 74/502.4 |
| 5,772,159 A * | 6/1998 | Wendt | ............ | 248/56 |
| 5,773,759 A * | 6/1998 | Hablutzel | ............ | 174/653 |
| 5,809,840 A * | 9/1998 | Oda et al. | ............ | 74/502.6 |
| 5,831,217 A * | 11/1998 | Jarvis et al. | ............ | 174/153 R |
| 5,862,710 A * | 1/1999 | Koenig | ............ | 74/502.4 |
| 5,866,853 A * | 2/1999 | Sheehan | ............ | 174/653 |
| 5,884,531 A * | 3/1999 | Koenig | ............ | 74/502.4 |
| 5,908,180 A * | 6/1999 | Daoud | ............ | 248/56 |
| 5,911,790 A * | 6/1999 | Bates et al. | ............ | 74/502.4 |
| 6,043,432 A * | 3/2000 | Gretz | ............ | 174/668 |
| 6,168,121 B1 * | 1/2001 | Kevassay | ............ | 248/49 |
| 6,189,408 B1 * | 2/2001 | Scheidling et al. | ............ | 74/502.4 |
| 6,272,948 B1 * | 8/2001 | Klippert | ............ | 74/500.5 |
| 6,335,488 B1 * | 1/2002 | Gretz | ............ | 174/372 |
| 6,435,056 B2 * | 8/2002 | Meyer | ............ | 74/502.4 |
| 6,476,322 B1 * | 11/2002 | Dunne et al. | ............ | 174/68.1 |
| 6,490,947 B2 * | 12/2002 | Burger | ............ | 74/502.4 |
| 6,499,909 B1 * | 12/2002 | Scheidling et al. | ............ | 403/351 |
| 6,543,799 B2 * | 4/2003 | Miyoshi | ............ | 280/283 |
| 6,561,057 B2 * | 5/2003 | Cebollero | ............ | 74/502.4 |
| 6,825,417 B2 * | 11/2004 | Ball | ............ | 174/74 R |
| 6,837,126 B2 * | 1/2005 | Matsuo | ............ | 74/502.4 |
| 6,874,600 B2 * | 4/2005 | Grundke | ............ | 188/2 D |
| 7,060,900 B1 * | 6/2006 | Gretz | ............ | 174/652 |
| 7,078,623 B1 * | 7/2006 | Sheehan | ............ | 174/665 |
| 7,353,728 B2 * | 4/2008 | Ruhlander et al. | ............ | 74/502 |
| 7,422,190 B2 * | 9/2008 | Messein et al. | ............ | 248/636 |
| 7,485,806 B1 * | 2/2009 | Gretz | ............ | 174/59 |
| 7,524,201 B2 * | 4/2009 | Ralph et al. | ............ | 439/162 |
| 7,554,041 B2 * | 6/2009 | Ducret | ............ | 174/655 |
| 7,559,714 B2 * | 7/2009 | Ruhlander | ............ | 403/263 |
| 7,582,836 B2 * | 9/2009 | Tapper | ............ | 174/650 |
| 7,597,027 B2 * | 10/2009 | Kwon | ............ | 74/502.6 |
| 7,609,924 B2 * | 10/2009 | Anderson et al. | ............ | 385/100 |
| 7,635,816 B1 * | 12/2009 | Shemtov | ............ | 174/650 |
| 7,770,489 B2 * | 8/2010 | Ruhlander | ............ | 74/500.5 |
| 8,146,455 B2 * | 4/2012 | Ruhlander | ............ | 74/473.15 |
| 8,245,379 B2 * | 8/2012 | Ruhlander | ............ | 29/434 |
| 8,288,667 B2 * | 10/2012 | Chiou | ............ | 174/652 |
| 8,367,944 B2 * | 2/2013 | Chiou | ............ | 174/520 |
| 8,397,756 B2 * | 3/2013 | Packham et al. | ............ | 137/614.05 |
| 8,448,994 B2 * | 5/2013 | Pisula et al. | ............ | 285/308 |
| 8,490,512 B2 * | 7/2013 | Ruhlander et al. | ............ | 74/502.4 |
| 8,511,201 B2 * | 8/2013 | Cho et al. | ............ | 74/502.4 |
| 2002/0104402 A1 * | 8/2002 | Ruhlander | ............ | 74/502.4 |
| 2004/0255712 A1 | 12/2004 | Ruhlander | | |
| 2006/0110217 A1 * | 5/2006 | Foster et al. | ............ | 403/384 |
| 2008/0121171 A1 * | 5/2008 | Hulsey | ............ | 116/216 |
| 2008/0178703 A1 * | 7/2008 | Anderson et al. | ............ | 74/502.4 |
| 2008/0250892 A1 | 10/2008 | Gordy et al. | | |
| 2009/0226691 A1 * | 9/2009 | Mankame et al. | ............ | 428/222 |
| 2010/0116965 A1 * | 5/2010 | McGuire | ............ | 248/557 |
| 2011/0061896 A1 * | 3/2011 | Bernauer et al. | ............ | 174/152 R |
| 2011/0155457 A1 * | 6/2011 | Horinaka | ............ | 174/659 |
| 2012/0018263 A1 * | 1/2012 | Marking | ............ | 188/266.2 |
| 2013/0228404 A1 * | 9/2013 | Marking | ............ | 188/266.2 |

FOREIGN PATENT DOCUMENTS

| | | |
|---|---|---|
| GB | 2447717 | 9/2008 |
| JP | 2006194378 | 7/2006 |
| WO | 9823874 | 6/1998 |
| WO | 2004036068 | 4/2004 |
| WO | 2009128834 | 10/2009 |

OTHER PUBLICATIONS

International Search Report and Written Opinion issued by the European Patent Office dated Feb. 23, 2011 for related PCT Application No. PCT/GB2010/051876.

* cited by examiner

Figure 4a
(Item 20)

Figure 4b
(Item 20)

Figure 5

Figure 7
(Item 20)

FIXING ELEMENT FOR A CABLE SYSTEM

CROSS-REFERENCE TO RELATED APPLICATIONS

This application is a US National Stage of International Application No. PCT/GB2010/051876, filed 10 Nov. 2010, which claims the benefit of GB 1002292.9, filed 11 Feb. 2010 and GB 0919682.5, filed 11 Nov. 2009, each herein fully incorporated by reference.

BACKGROUND OF THE INVENTION

Automotive manufactures constantly strive for enhancements in drive quality. A key element of this noise and vibration (NVH) reduction within the passenger cell. This can come from many sources including 'combustion' from the engine and 'gear whine' from the gear box. Much of this noise is transferred through components that pass from the engine compartment to the passenger cell, one such component being the transmission cable.

Figure 1:
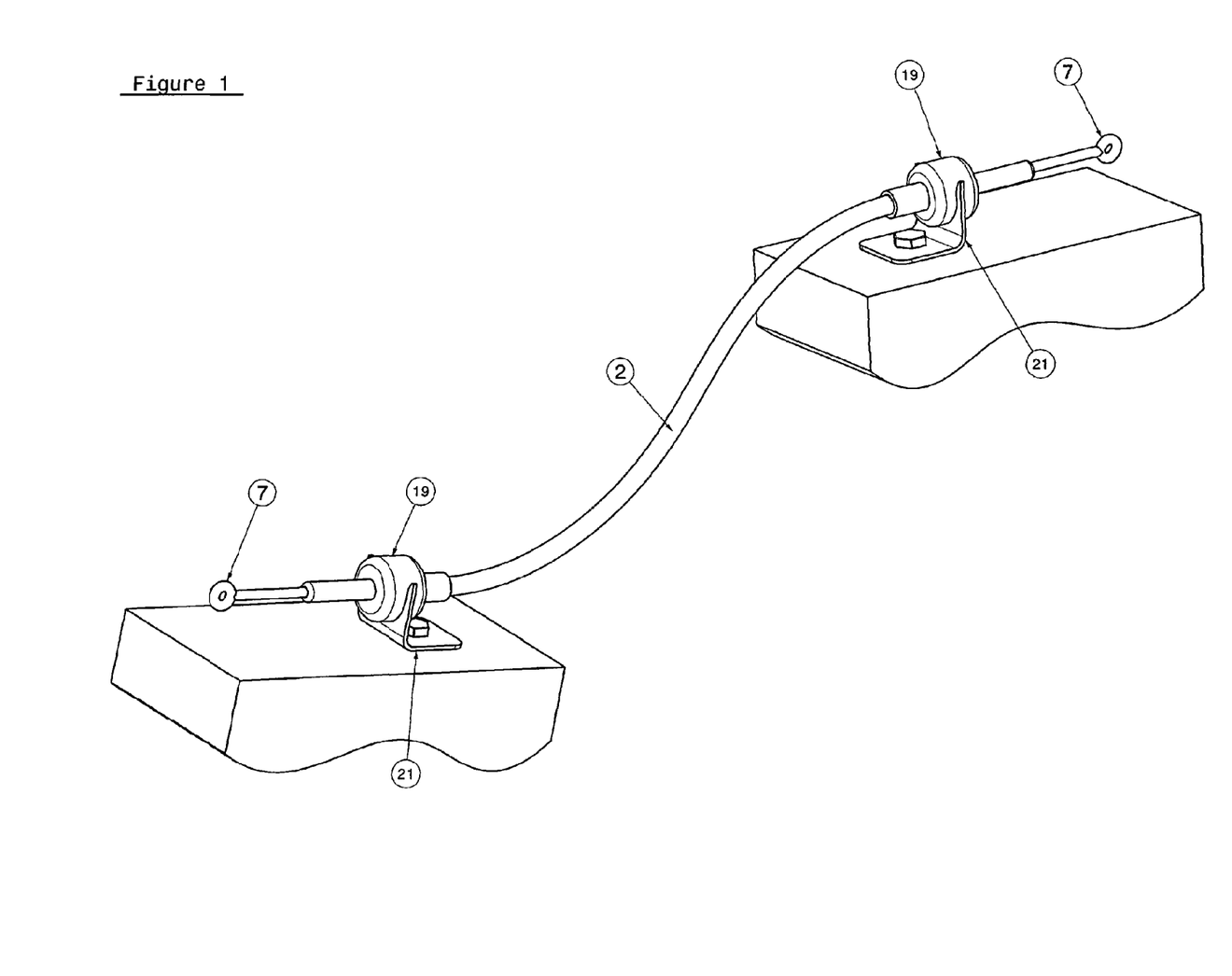
FIG. 1 is a schematic representation of a gear box connected by a transmission cable to a gear shifter.

Transmission cables provide mechanical actuation of the gear box from the gear shifter as shown schematically in FIG. 1. They can be manual cables (2 legs) or automatic cables (1 leg) 2. They connect directly to the gear box passing through the vehicle bulk head into the passenger cell, attaching to the gear shifter.

Figure 2:
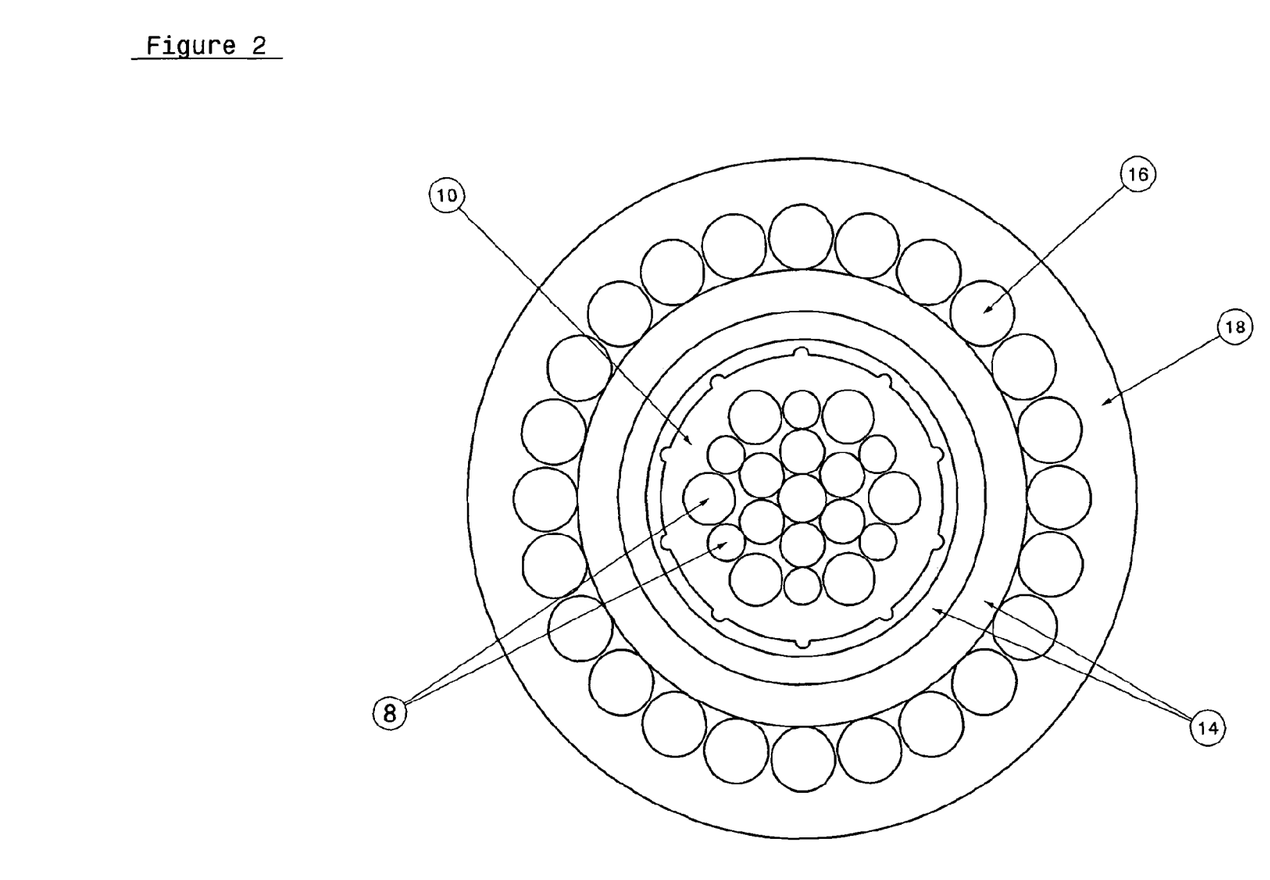
FIG. 2 is a schematic cross sectional representation of a suitable transmission cable and conduit.
Figure 3:
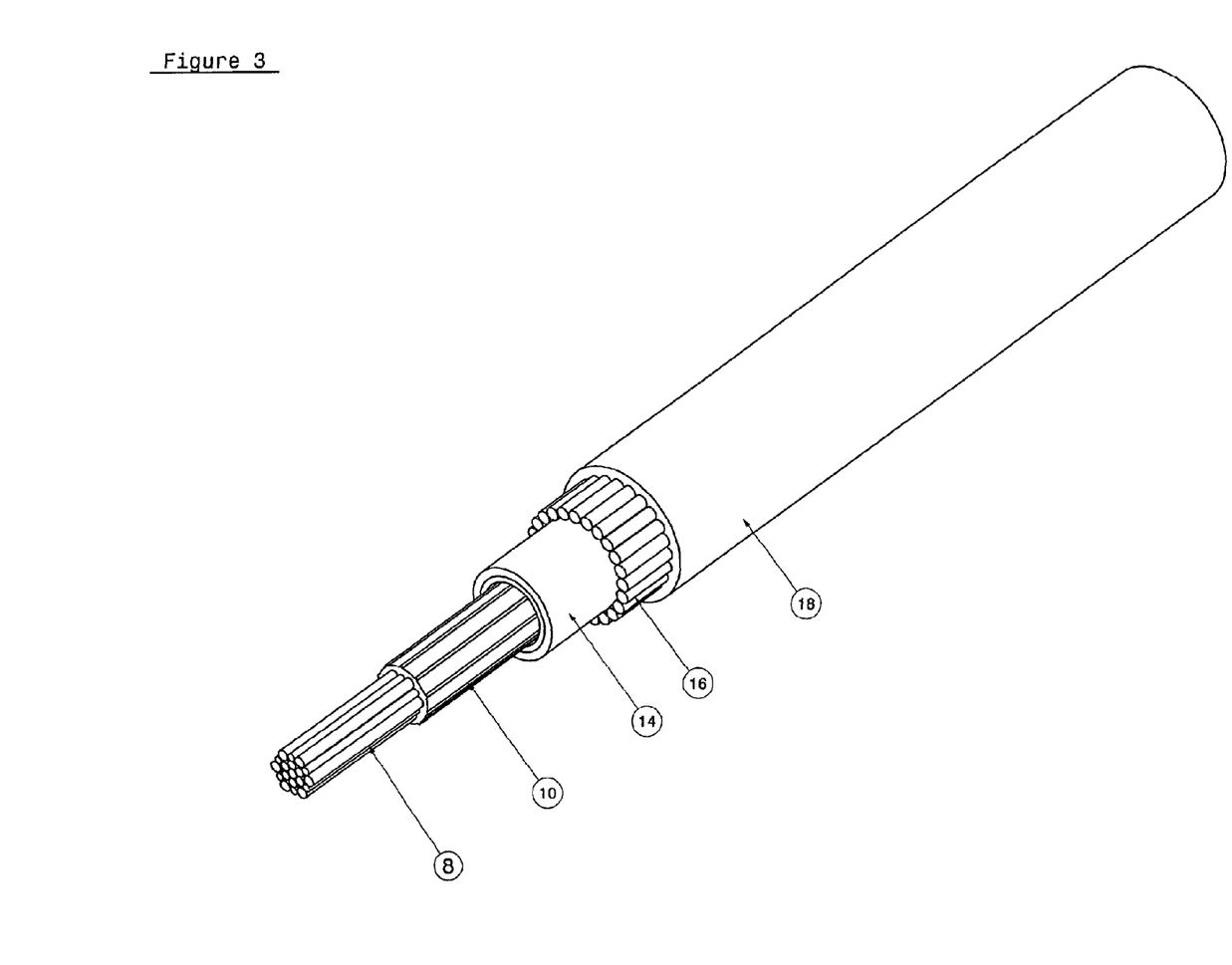
FIG. 3 is a schematic perspective representation of the cable and conduit.

These cables generally have two main components. The first is the inner cable 7 which provides the mechanical movement. This is usually constructed from a series of wound steel filaments 8 which forms the cable and is generally coated with a low friction polymer 10 such as Nylon 66. At each end of the inner cable is an 'eye end' which allows connection to the gear box and shifter. A cross sectional view of the cable and conduit is represented in FIG. 2, and a perspective representation of the cable and conduit with each layer from inside outwards peeled back to clearly show the layers of the cable and the conduit.

The inner cable runs inside the conduit 12 which forms the second part of the cable. This may be of a multilayered construction consisting of a low friction liner 14 of PTFE or PBT which is wound with steel wires 16 and coated with a polymer 18 such as polypropylene. With reference to FIG. 1, at a point along the conduit is a fixing element 19, often termed an 'abutment' which attaches to the body of a vehicle. In particular, the practice has developed of anchoring the conduit to an opening in a bracket 21 or bulkhead across which the inner cable 7 passes.

Figure 4A:
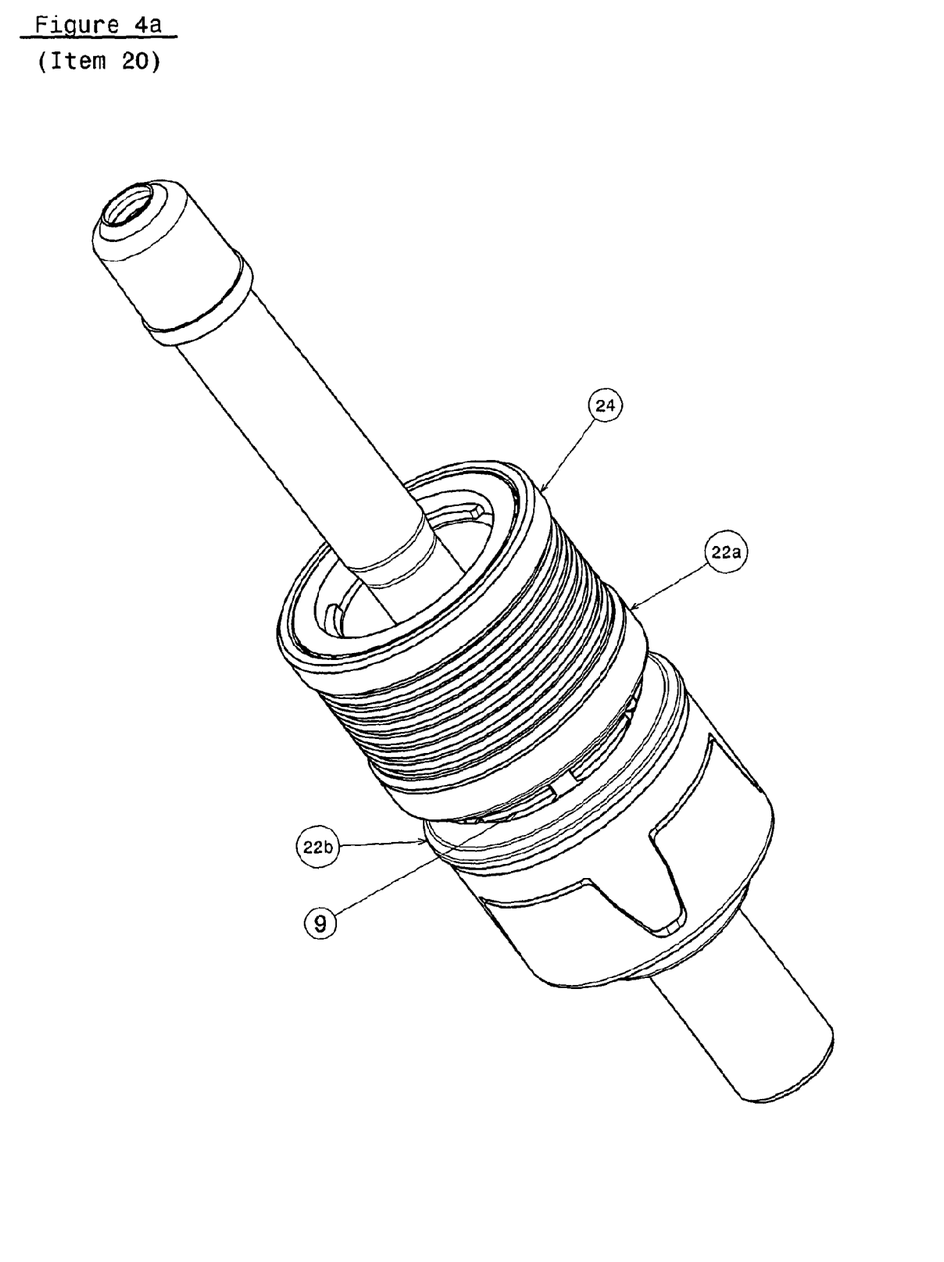
FIG. 4a is a schematic perspective view of a prior art abutment.
Figure 4B:
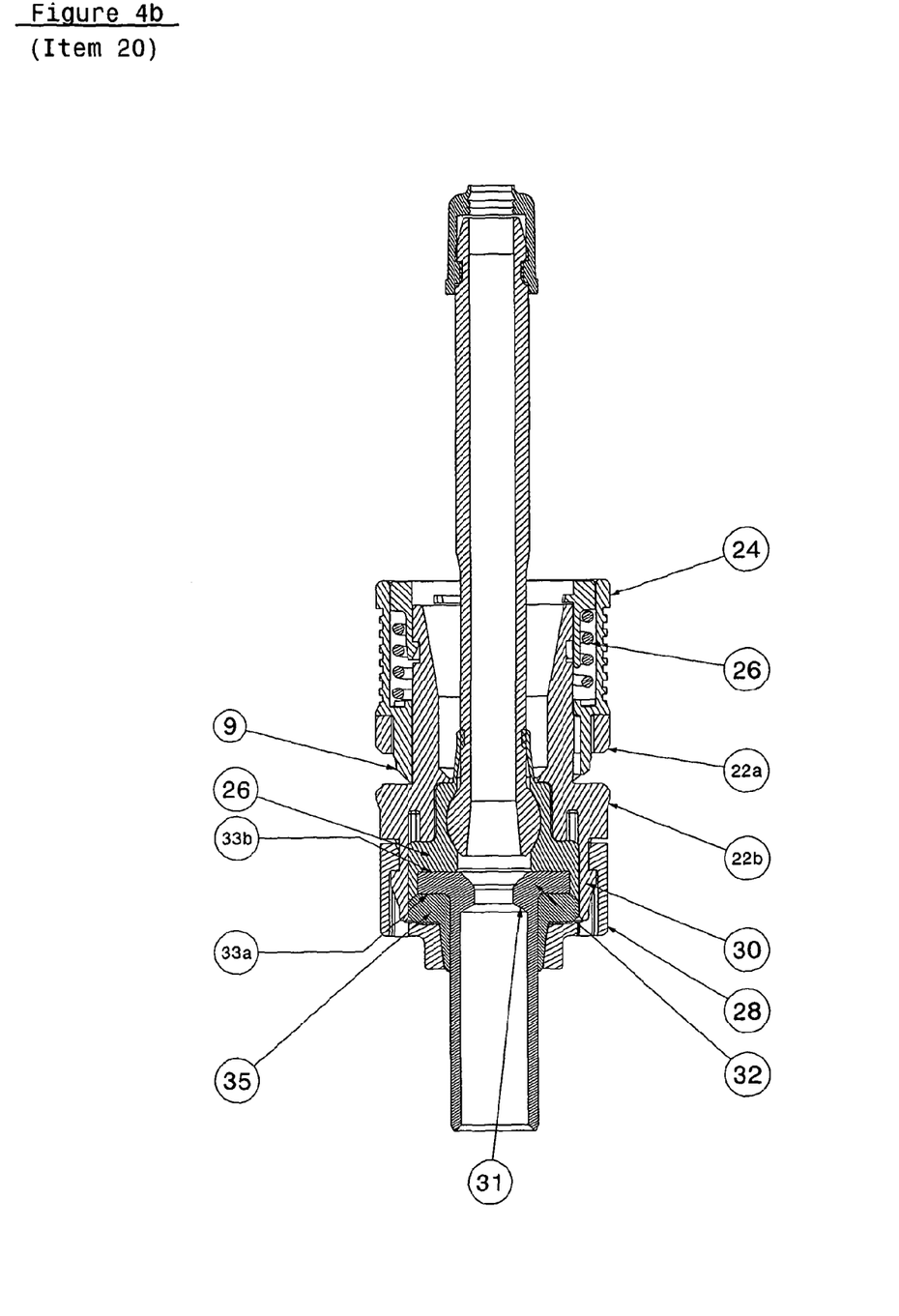

The abutment must be durable. Automotive components must withstand a combination of harsh loading and environmental conditions. A typical transmission cable must withstand operating loads of up to 300N whilst undergoing in excess of 1 million operating cycles. This is in combination with temperatures between −50 C and +130 C, in the presence of 90% humidity, corrosive and abrasive environments. FIGS. 4a and 4b show a prior art abutment in perspective and cross section views, and FIG. 5 shows three views of the inner part of the prior art abutment showing the damper and channel for receiving the cable.

The anchoring point (not shown) comprises a bracket or similarly fixed member having a generally U-shaped slot for receiving the abutment attached to a cable. The abutment is located in the slot of the bracket and fixed by some sort of means so as to resist withdrawal of the abutment from the slot and also axial movement of the abutment relative to the slot. Details of a suitable abutment are described in International patent application published under number WO2004/ 036068. Referring to FIGS. 4a and 4b, the abutment body defines two opposing shoulder portions 22a and 22b wherein the axial distance between the shoulder portions is fixed and defines an engagement portion of the abutment body 20. The collar 24 can be retracted axially against a spring 26 which in turn retracts the chamfered end 9 which has a plurality of grooves therein which in use passes into an engagement portion of a bracket fixed to the vehicle body. The abutment body 20 extends in the opposing axial direction away from the collar to provide a cavity therein for receipt of the damper 26. A cap 28 is provided for ensuring that the damper is retained in the abutment body 20. The cap is secured to the abutment body by a plurality of fingers 30 which have on their underside a recess configured to receive a corresponding protrusion on the abutment body 20. This ensures that accidental release of the cap 28 is unlikely.

A receiving element 32 is provided which is swaged onto the conduit. The receiving element includes a seat 31 and in combination with the swaging operation prevents longitudinal movement of the conduit relative to the receiving element. The damper is provided either side of the receiving element which includes shoulder portions 33a and 33b. The damper may be provided in a single part formed around the receiving element or alternatively may be provided into discreet portions which are arranged such that one of the portions of the damper extends over the radial edge of the receiving element which provides damping material in communication on both sides of the receiving element and in particular the shoulders thereof. This can be shown at point 35 showing that the damper extends over the peripheral radial edge of the receiving element defining the peripheral shoulder portion 33a and 33b.

Figure 5:
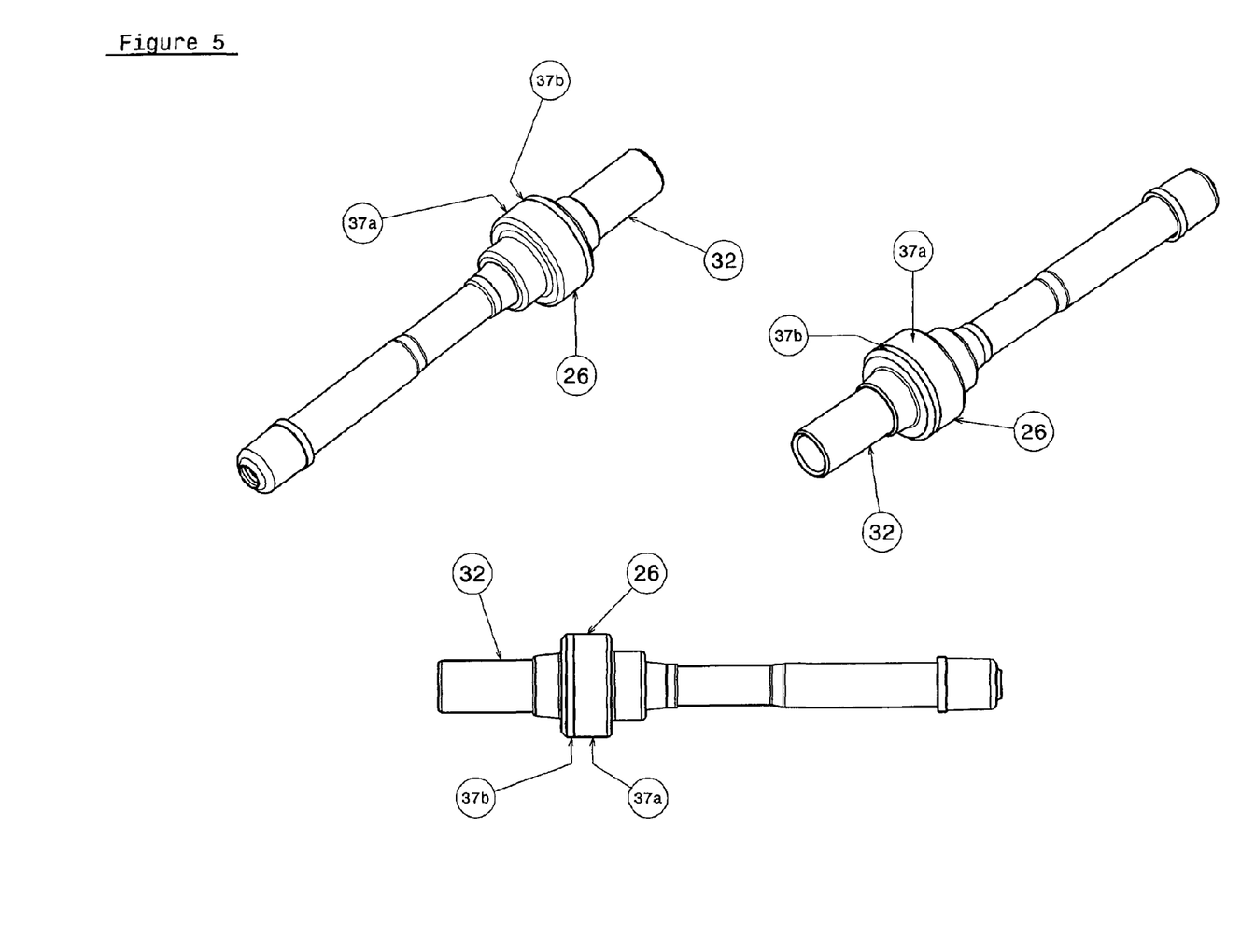
FIG. 5 are three views of the inner part of the abutment showing the damper and channel for receiving the cable.

FIG. 5 is a schematic representation showing the damper 26 and receiving element 32. FIG. 5 clearly shows that the damper may be formed of two discreet portions 37a and 37b where the portion 37a have increased longitudinal length and seats over the circumferential radial edge of the receiving element which defines the shoulder portions 33a and 33b.

Due to the metal filaments used in construction conduit transmission cables are an extremely efficient transfer path for NVH. The current technique of NVH reduction is to attach steel damper weights to each conduit. Such damper weights typically weigh approximately 300 g. The vibration input signals at the gear box end of the cable vary depending on the vehicle type, engine size and type and gear box. They can have a frequency range from 20 Hz to in excess of 4000 Hz and have amplitude levels of 1 g to 6 g. The signal and hence the issue can be from a very specific input frequency e.g. 25 Hz or can be over a broader range such as 1900 Hz to 2400 Hz.

These input signals then transfer through the cable and manifest either as audible noise in the passenger cell or as excessive vibration in the gear shift lever. A measure of the effectiveness of this transfer is called the Transfer Function (TF) and is calculated by dividing the output signal by the input signal. A TF>1 means the conduit amplifies the vibration, a TF<1 means the conduit attenuates or damps the vibration, and a TF of 0 means the conduit removes all vibration from the system. The damping works by absorbing and dissipating a significant proportion of the energy of the vibration. This vibration energy is then not available for transfer down the cable into the passenger cell.

A Transfer Function at or closest to zero is preferred, and this is traditionally achieved through use of steel damper weights, attached to the conduit.

BRIEF SUMMARY OF THE INVENTION

The present invention provides for an improved abutment.

According to the present invention there is a fixing element for securing a conduit for carrying a cable therethrough to a vehicle body, the conduit comprising a first portion and a second portion, wherein the fixing element is configured to retain a damper for absorbing vibration in the longitudinal length of the conduit between the first and second conduit portion, at least a portion of the damper being formed of silicone rubber.

This fixing element reduces NVH vibration transferred down the conduit between a first conduit portion that may guide the cable from the gearbox and the second conduit portion that may guide the cable to the gear shifter.

The provision of a fixing element that reduces or eliminates noise transfer, without the use of additional damper weights or with the use of lighter damper weights enables a light weight, cost effective solution which can be applied to a wide range of vehicle applications.

The fixing element beneficially comprises a predominantly polymeric material. A significant benefit of the present invention is the weight reduction associated with the provision of a fixing element that does not require (or reduces the weight requirement of) the use of a steel damper weight and additionally the associated cost reduction in removing the requirement for a damper weight. As the fixing element is a generally polymeric material, then the weight of the fixing element can be significantly reduced. In one embodiment the body is moulded from a polymeric material.

The longitudinal length of the damper that performs the damping function is beneficially greater than 15 mm. The longitudinal length of the damper that performs the damping function is beneficially greater than 18 mm. The longitudinal length of the damper that performs the damping function is greater than 21 mm. The longitudinal length of the damper that performs the damping function is substantially 23 mm. The longitudinal length of the damper that performs the damping function is preferably in the range 15-35 mm. Such longitudinal length is defined as between the end surfaces that seat against the abutment body and cap thus providing substantially all of the damping capability. In the exemplary embodiment, the damper is separated into two portions by the receiving element, which is made of a rigid polymer, however the length of the damper is defined as the longitudinal length of the damper material only, that performs the damping function.

The damper is preferably substantially circular and preferably has a diameter of substantially 23 mm or greater than 23 mm. The fixing element is generally cylindrical and comprises a cylindrical opening therein for receiving the substantially cylindrical damper. A cap is beneficially provided for securing the damper in a fixing element. The cap may secure to the body by a number of alternative configurations and in one embodiment comprises one or more recesses for receiving corresponding protrusions on the body. The cap and body of the fixing element are configured such that once the cap is located onto the body, the outer profile of the body and cap together in the longitudinal direction generally form a substantially continuous profile. The cap is also beneficially comprised of a predominantly polymeric material. Again, it is beneficial that the cap is polymeric as the cap can then be moulded in a single piece.

At least a portion of the damper is beneficially supported by a receiving element having a rim portion arranged to support the damper, wherein the damper and receiving element are both retained by the fixing elements. The rim portion preferably defines an annular seating surface for supporting the damper. The damper is beneficially formed of at least two discrete portions. Each damper portion is preferably configured to seat on opposing sides of the receiving element. The receiving element also beneficially includes a protrusion configured to extend into a corresponding recess in the damper, and preferably two protrusions, extending into each damper portion.

The receiving element beneficially comprises an opening for receipt of the conduit, the receiving element defining a shoulder portion configured to retain the conduit in the longitudinal axis of the fixing element. The vibration flow path therefore passes from the conduit to the receiving element and is then damped by the damper.

BRIEF DESCRIPTION OF THE DRAWINGS

The Shore hardness of the silicon rubber is beneficially in the range 20-90 A. The Shore hardness of the silicone rubber is even more beneficially in the range 30-70 A. Even more beneficially, the Shore hardness of the silicone rubber is in the range 35-50 A. Even more beneficially, the Shore hardness of the silicone rubber is in the range 35-45 A.

The present invention will now be described by way of example only with reference to the accompanying drawings, in which:

FIG. 4b is a cross sectional representation of the abutment as shown in FIG. 4a.

FIG. 8b is a schematic side view of a damper mounted on the receiving element according to an exemplary embodiment of the present invention.

DETAILED DESCRIPTION OF PREFERRED EMBODIMENTS

Figure 6A:
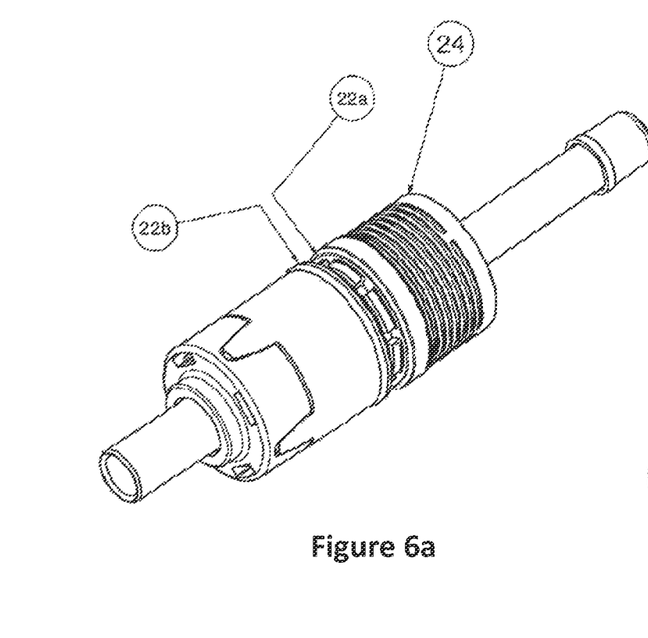
FIGS. 6a and 6b are perspective views of an abutment according to an exemplary embodiment of the present invention.
Figure 6B:
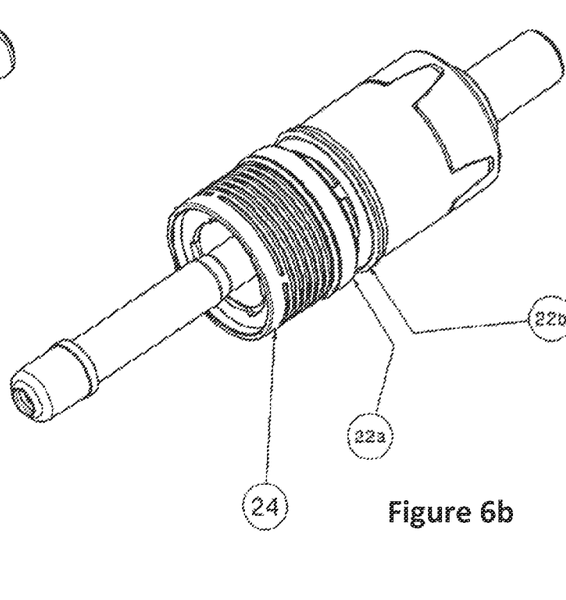
Figure 7:
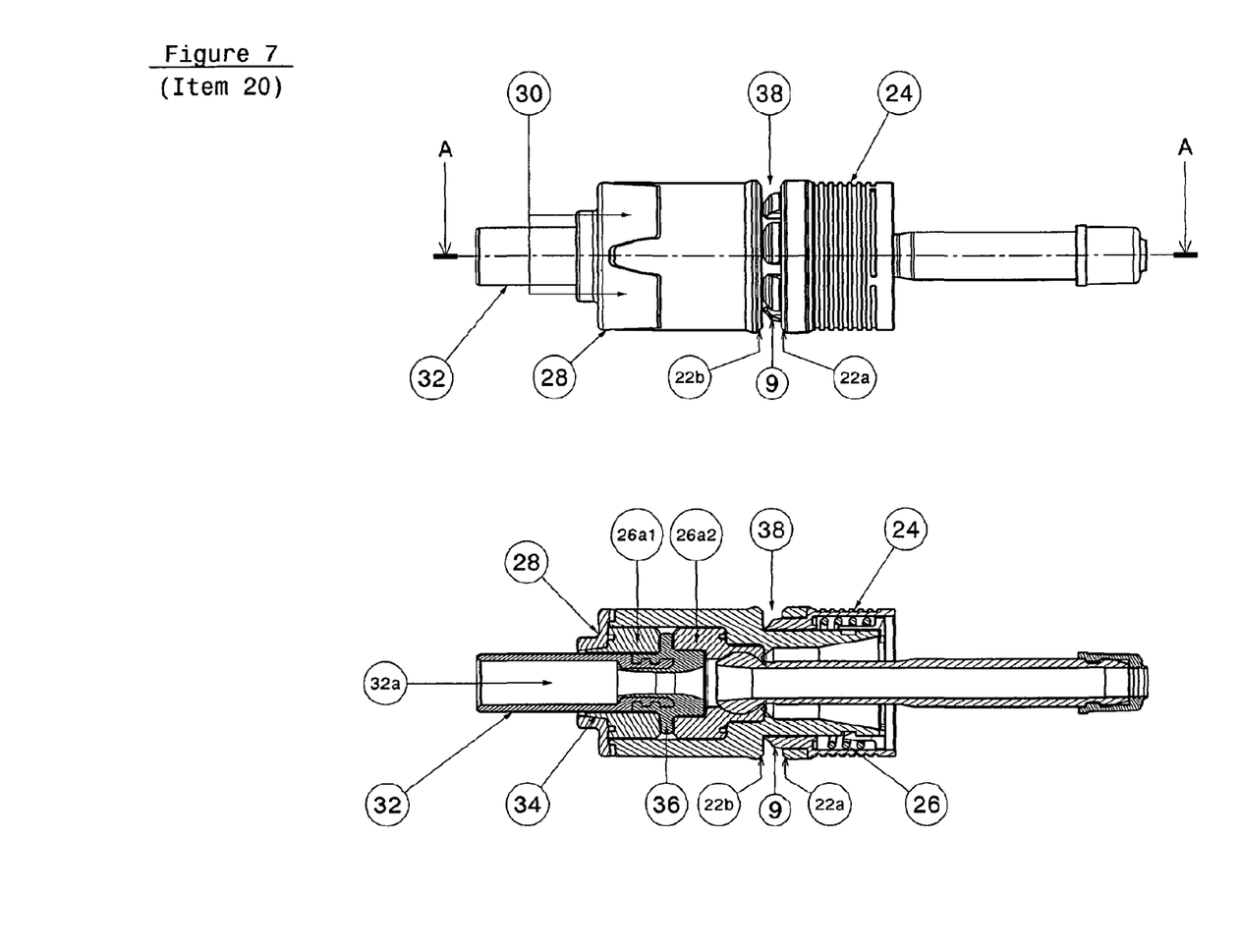
FIG. 7 is a schematic side view and corresponding cross sectional representation of an abutment according to an exemplary embodiment of the present invention.

Referring to FIGS. 6 and 7, an exemplary embodiment of an abutment is shown which is designed to communicate with an anchoring point on the vehicle body operation of the abutment for securing to the fixed member has been described with reference to FIGS. 4a and 4b of the prior art.

Figure 8:
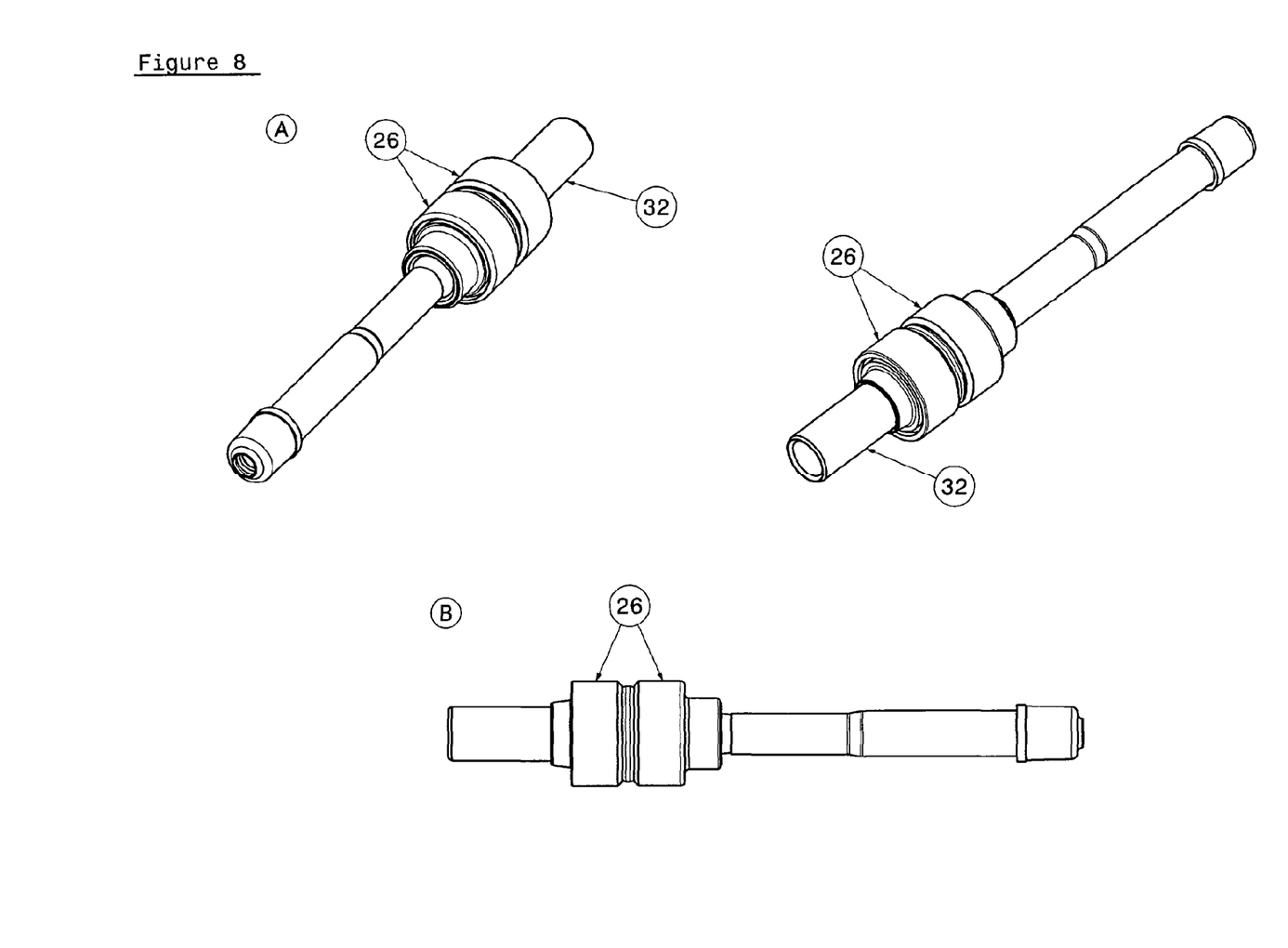
FIG. 8 is a schematic perspective representation of a damper mounted on the receiving element according to an exemplary embodiment of the present invention.

In an exemplary embodiment, the configuration of the damper arrangement is different to the prior art arrangement and will now be described. A receiving element 32 including cylindrical portion 32a defines an internal shoulder 34 onto which the steel wires of the conduit abuts. The receiving element also includes a portion 36 which is configured to seat the two damper sections 26 in this exemplary embodiment and comprises a rim of greater diameter thus defining lips onto which opposing damper portions are seated. In one embodiment, opposing damper portions separated by the lips do not touch one another. The receiving element 32 is beneficially a metallic material and is swaged onto the conduit and is in permanent communication the polymeric portion 36. The damper and the receiving element are represented asymmetrically and in a side view in FIGS. 8a and 8b respectively. It will be appreciated that the inner cable runs through the entire abutment from the first conduit portion including the receiving element to the second conduit portion 37. Vibration travelling longitudinally through the first and second portions of the conduit is thus absorbed.

Figure 9:
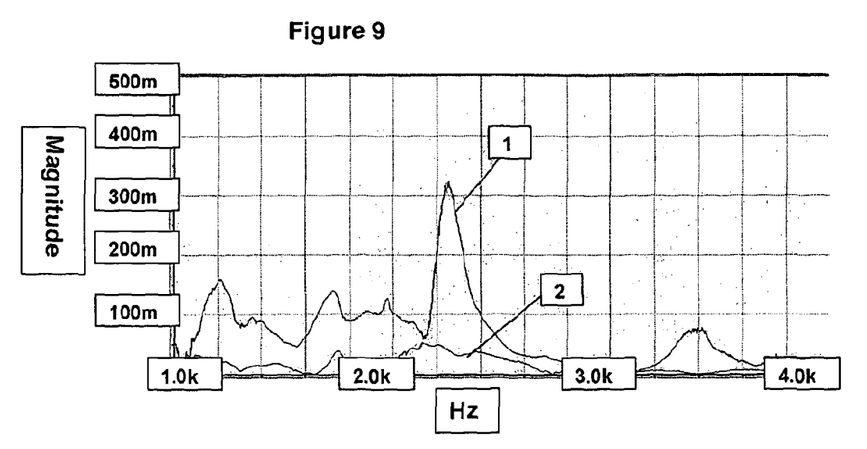
FIG. 9 is a graphical representation of the transfer function (y axis) versus frequency (x axis) for a 40 Shore hardness damper of 11 mm longitudinal length (1) and 40 Shore hardness damper of elongated (24 mm) longitudinal length (2).

The elongate portion of the abutment body on the opposing side of the groove 38 is elongate in order to accommodate an increased damper length. A typical damper length of a prior art abutment is 11 mm and is made of EPDM polymer having a hardness of 65 Shore. This longitudinal length is measured to include the largest diameter portion only of the damper and does not include any portion extending beyond the end of the largest diameter portion that does not perform a damping function. This can be clearly seen with respect to the damper according to an exemplary embodiment of the present invention shown in FIG. 8. In conjunction with an abutment having an 11 mm longitudinal length and EDPM damper, a damper weight is attached to the conduit to improve the NVH performance thus decreasing the transfer function. In the exemplary embodiment shown, the length of the damper is increased to, for example, 24 mm, measured as indicated by the sum of arrows A, plus $A_2$ in FIG. 7. Represented in FIG. 9 is a graphical representation of the transfer function (i.e. output divided by input vibration) versus frequency for silicone rubber 40 Shore standard length and an elongated abutment including a damper of length 24 mm. The plot represented by numeral (1) shows the transfer function of a silicone rubber damper having hardness of 40 Shore and longitudinal length of 11 mm and plot (2) shows the transfer function for an axial length damper of 24 mm, again of a silicone rubber damper of 40 Shore. As can be seen from the graph, the transfer function decreases overall from approximately 0.1 to 0.3, to below 0.05 with the increase in length of the damper from 11 mm to 24 mm.

The hardness of the damper falls within a defined range as if the rubber is too soft the feel of the gear shift is spongy and poor leading to gear shifts lacking positive engagement. However, conversely, having the damper being too hard gives reduced damping performance.

Figure 10:
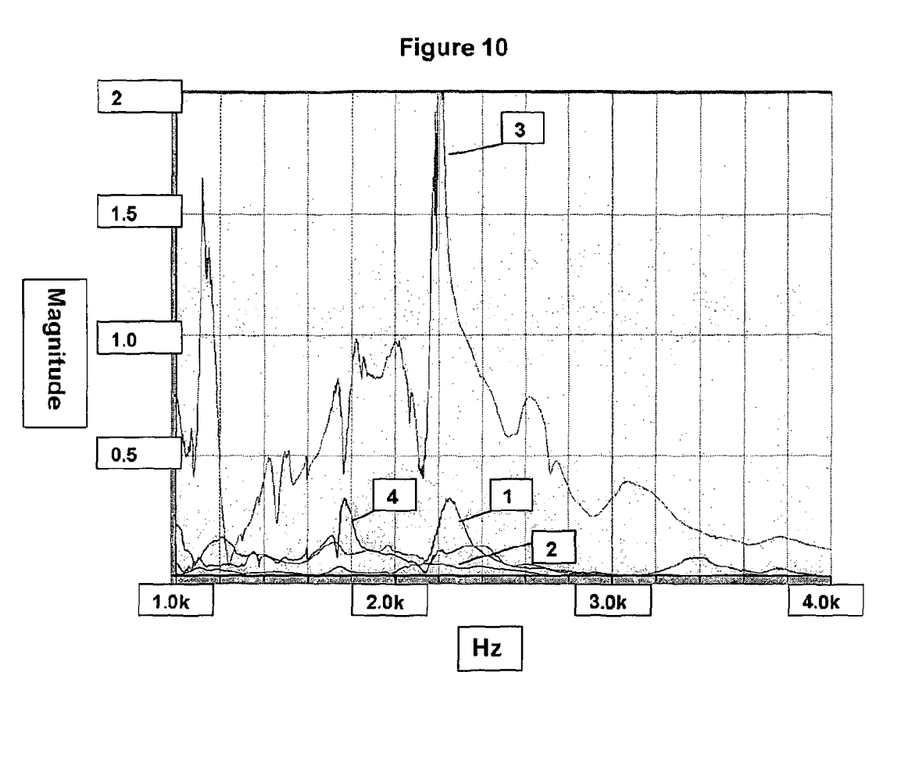
FIG. 10 is a graphical representation of the transfer function (y axis) versus frequency (x axis) for the dampers as plotted in FIG. 9, plus the plot for a EDPM Shore hardness 65 damper (3) and an EDPM Shore hardness 65 damper (4) with damper weights.

FIG. 10 shows the same graph as FIG. 9 replotted on a larger scale comparing a standard EPDM 65 Shore damper of longitudinal length 11 mm plotted as indicated by reference numeral (3) with no damper weight and also the same standard EPDM 65 Shore damper using a damper weight as plotted indicated by numeral (4). It is clear that use of a silicone damper significantly reduces the transfer function compared to standard EPDM 65 Shore dampers. Direct comparison can be made between plots represented by (4) and (1) respectively. Furthermore, a significant improvement in reduction of transfer function can also be seen with increasing of the axial length of the damper from 11 mm to 24 mm. Comparison is given in plot (4) which shows a standard EPDM 65 Shore damper in conjunction with a damper weight currently used in the art. It is apparent that an elongated damper of 40 Shore silicone rubber as represented in plot (2) further reduces the transfer function to below that of the known EPDM damper plus damper weight.

The damping properties of silicone rubbers are due to their unique structure. In an exemplary embodiment, polysiloxane can be used as the damper material. Polysiloxane is very flexible due to large bond angles and bond lengths when compared to those found in more basic polymers such as polyethylene. For example, a C—C backbone unit has a bond length of 1.54 Å and a bond angle of 112°, whereas the siloxane backbone unit Si—O has a bond length of 1.63 Å and a bond angle of 130°. The siloxane backbone differs greatly from the basic polyethylene backbone, yielding a much more flexible polymer. Because the bond lengths are longer, they can move further and change configuration easily, making for a flexible material.

Investigation has been made into the effect of the damping geometry (i.e. the length and the diameter of the abutment and thus the damper) on the damping performance of the abutment. A testing programme was carried out on a cable system as basically represented in FIG. 1 wherein an input accelerometer was provided on the abutment adjacent the transmission end of the cable (for example the left hand abutment as represented in FIG. 1) and an output accelerometer was positioned on the abutment at the shifter end (which could be the right hand abutment as represented in FIG. 1). An input shaker vibration was provided through abutment bracket at the transmission end of a random signal in the range 1000 Hz-4000 Hz. The input signal is measured via a transducer at the transmission abutment as shown. The output acceleration was measured from a transducer on the shifter abutment. The data from these two transducers was then analysed and a transfer function produced over the frequency range. This is a measure of the effectiveness of the damping in the system.

To use this system to investigate the effect of geometry and shape on the damping performance it was decided to integrate the transfer function between 1000 Hz and 4000 Hz, therefore producing a transfer function value for each unique geometry. This is a measure of the damping performance; as damping increases the value decreases. This then allowed the change in transfer function or damping performance to be plotted against the specific geometry feature as represented in FIGS. 11 and 12.

Firstly the length of the abutment was varied to give a change in damping length (A1+A2 as represented in FIG. 7) from 0 mm to 53 mm. Seven different lengths are tested to develop the relationship between length and damping performance.

Figure 11:
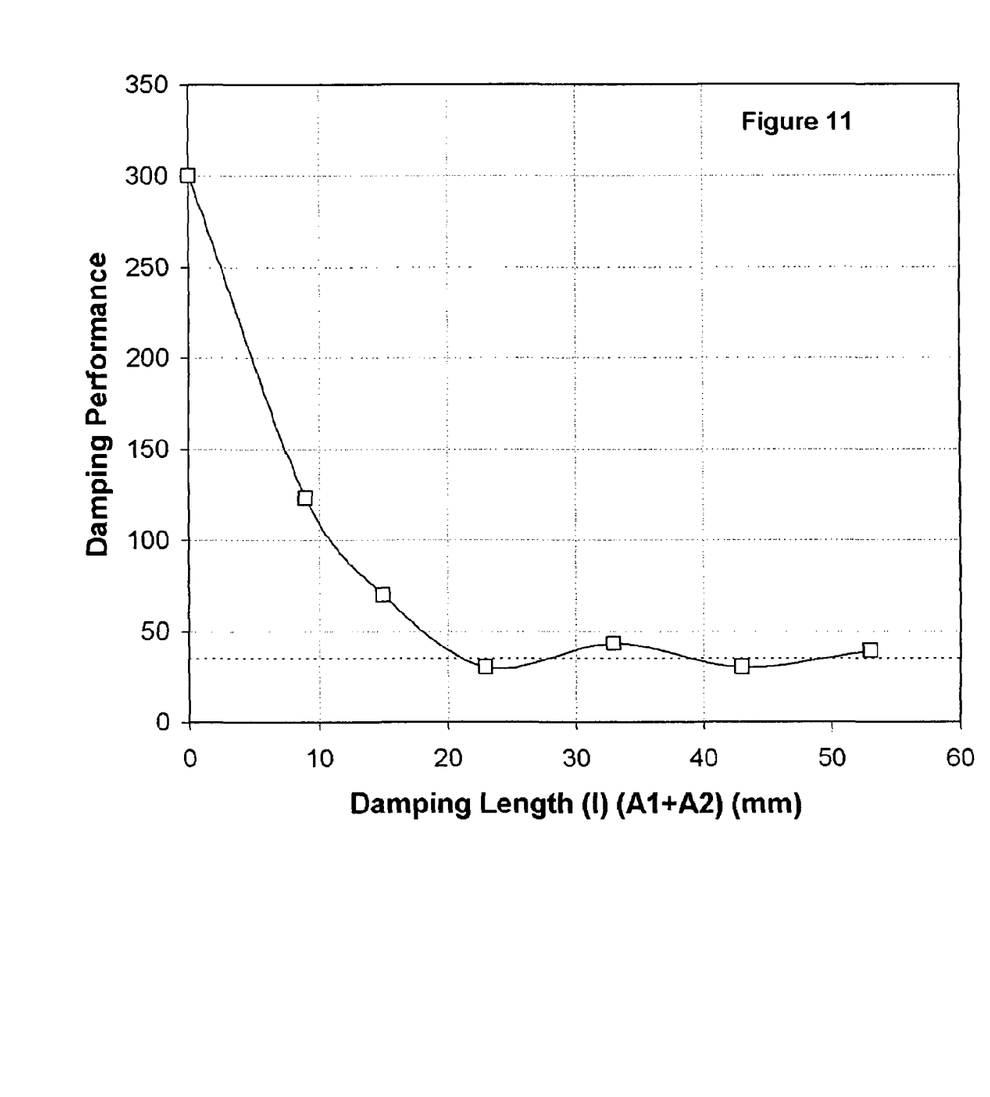
FIG. 11 is a graphical representation of the damping performance of the abutment (y axis) versus the damper length (x axis) at constant abutment diameter of 23 mm.
Figure 12:
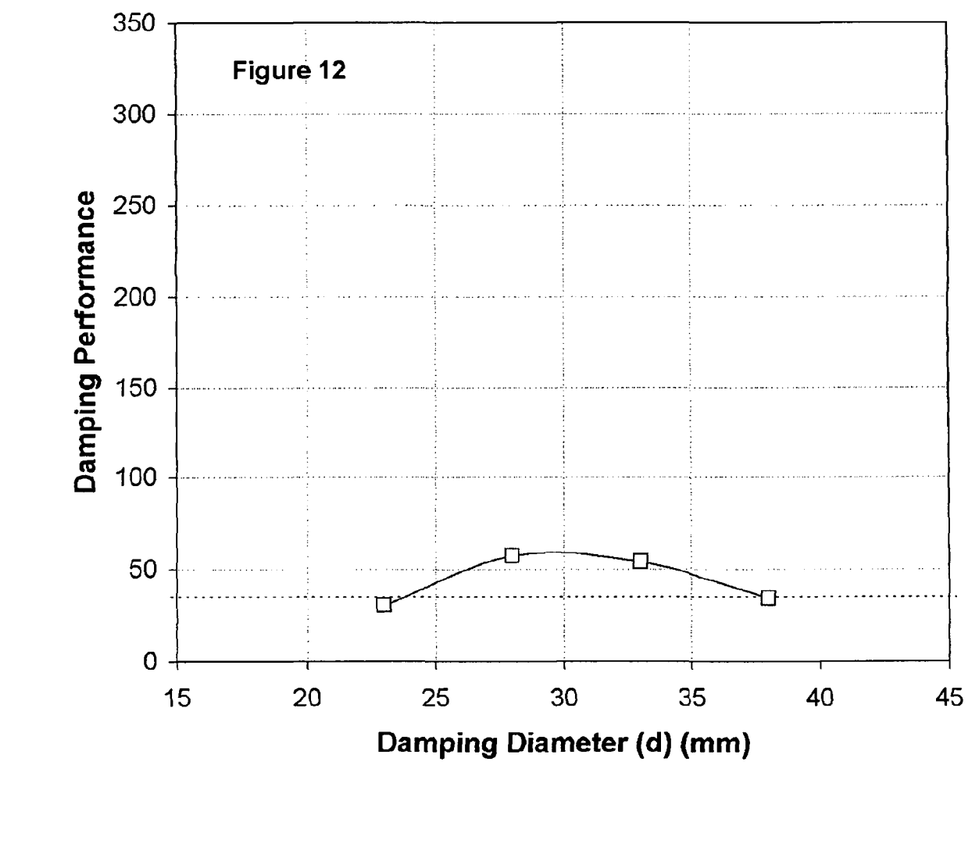
FIG. 12 is a graphical representation of the damping performance of the abutment (y axis) versus the abutment diameter (x axis) with constant damper length of 23 mm.

The result of this test is represented in FIG. 11 showing the damping performance on the y axis relative to the damper length in mm. The dashed horizontal line shows the damping performance produced by a cable using metal damper weights and an EPDM damper material which is the performance target. This graph clearly indicates the strong relationship between damping performance and length to approximately 20 mm. The damping performance increased by a factor of four as the length increased from 9 mm to 23 mm and passes the damper weight target. As can be seen in FIG. 11, further increases beyond this length produce no further improvement in damping performance.

It will be appreciated that the damper material provided in the abutment and as represented clearly in FIG. 7 is actually longer in length than the length of A1+A2. However, the portion of the abutment comprising length A1+A2 performs substantially all of the damping function of the damper. The remaining damper material, for example represented by numeral 26b in FIG. 7 is arranged to receive an element of the second conduit portion that extends from the abutment. This portion of the damper provides a sheath for the second conduit portion.

The diameter of the abutment was varied to give a change in abutment diameter [(d) as shown in FIG. 7 and accordingly damper diameter where the abutment causing thickness remains constant] from 23 mm up to 38 mm, and whilst maintaining the longitudinal length of the damper of 23 mm. A minimum of 23 mm was taken as this is the lower limit available to allow the components to be successfully joined the cable. Four different diameters were tested to develop the relationship between diameter and damping performance.

The relationship between damping performance and diameter is presented in FIG. 12. The dashed line shows the damping performance produced by a cable using metal damper weights and EPDM damper material. This level is the performance target. This graph shows no relationship between damping performance and diameter above 23 mm. Increases beyond this diameter produce no improvement in damping performance.

Analysis of the results from section A and B allow optimisation and minimisation of the component size whilst maximising the damping performance.

It is clear there is a strong between damping length and damping performance up to approximately 23 mm. Therefore the damping length is beneficially a minimum of 23 mm long for optimal performance. However it appears it does not need to be any longer than this as no further improvement is noted.

Conversely there is no real relationship between damping diameter and damping performance. There is no benefit in increasing the diameter of the abutment above 23 mm for improvement in damping capability, which is standard for prior art abutments. However, it will be appreciated that abutment diameter may be increased for strength requirements. Reduction below this diameter is not preferred as a smaller abutment does not contain the loads and fix the cable to the vehicle in a satisfactory manner.

It will therefore be appreciated by a skilled addressee that a fixing element according to the present invention offers significant advantages over current fixing elements. A significant advantage is that the fixing element is of low weight and either completely removes the requirement for an additional damper weight to be attached to the conduit, or reduces the damper weight required. Significant improvements in NVH performance are therefore achieved independently through the provision of a silicone damper material and in the elongation of such a damper.

The present invention has been described by way of example only and it will be appreciated by a skilled addressee that modifications and variations may be made without departing from the scope of protection afforded by the appended claims.

The invention claimed is:

1. A fixing element for securing a conduit having a longitudinal length extending in a longitudinal axis, the conduit for carrying a cable therethrough to a vehicle body, the conduit comprising a first conduit portion and a second conduit portion, the fixing element comprising:
    an abutment body having a peripheral groove and a cavity, the peripheral groove defining an engagement portion of the abutment body for engaging with a vehicle body; and
    a damper retained in the cavity of the abutment body, the damper having a longitudinal length extending in the longitudinal axis of greater than 15 mm;
    wherein the damper absorbs vibration in the longitudinal length of the conduit between the first and second conduit portions; and
    wherein at least a portion of the damper is formed of silicone rubber.

2. A fixing element according to claim 1 wherein the fixing element comprises a predominantly polymeric material.

3. A fixing element according to claim 1 wherein the longitudinal length of the damper that performs the damping function is greater than 18 mm.

4. A fixing element according to claim 1 wherein the longitudinal length of the damper that performs the damping function is greater than 21 mm.

5. A fixing element according to claim 1 wherein the longitudinal length of the damper that performs the damping function is substantially 23 mm.

6. A fixing element according to claim 1 wherein the longitudinal length of the damper that performs the damping function is in the range 15-35 mm.

7. A fixing element according to claim 6 wherein the longitudinal length of the damper that performs the damping function is in the range 18-27 mm.

8. A fixing element according to claim 1 wherein the damper is substantially circular and has a diameter of substantially 23 mm or greater than 23 mm.

9. A fixing element according to claim 1 further comprising a receiving element with a rim portion, wherein at least a portion of the damper is supported by the rim portion.

10. A fixing element according to claim 9 wherein the rim portion defines an annular seating surface for supporting the damper.

11. A fixing element according to claim 9 wherein the damper is formed of at least two discrete portions.

12. A fixing element according to claim 11 wherein each damper portion is seated on opposing sides of the receiving element.

13. A fixing element according to claim 9 wherein the receiving element includes a protrusion extending into a corresponding recess in the damper.

14. A fixing element according to claim 9 wherein the receiving element comprises an opening for receipt of the first conduit portion, the receiving element defining a shoulder portion for retaining the conduit in the longitudinal axis of the fixing element.

15. A fixing element according to claim 1 wherein the Shore hardness of the silicone rubber damper is in the range 20-90 A.

16. A fixing element according to claim 1 wherein the Shore hardness of the silicone rubber damper is in the range 30-70 A.

17. A fixing element according to claim 1 wherein the Shore hardness of the silicone rubber damper is in the range 35-50 A.

18. A fixing element according to claim 1 wherein the Shore hardness of the silicone rubber damper is in the range 35-45 A.

19. A transmission cable system comprising:
    a conduit having a longitudinal length extending in a longitudinal axis, the conduit for carrying a cable therethrough to a vehicle body, the conduit comprising a first conduit portion and a second conduit portion; and a fixing element comprising:
an abutment body having a peripheral groove and a cavity, the peripheral groove defining an engagement portion of the abutment body for engaging with a vehicle body; and
a damper retained in the cavity of the abutment body, the damper having a longitudinal length extending in the longitudinal axis of greater than 15 mm;
wherein the damper absorbs vibration in the longitudinal length of the conduit between the first and second conduit portions; and
wherein the damper is formed of silicone rubber.

20. A transmission cable system according to claim 19 having a longitudinal length in the range of substantially 0.5 m to substantially 3 m.

21. A fixing element according to claim 1 further comprising two opposing shoulder portions defining the peripheral groove of the abutment body, wherein an axial distance between the shoulder portions is fixed.

22. A fixing element according to claim 1 further comprising a collar member axially moveable relative to the abutment body, the collar member having a leading edge that extends into the peripheral groove of the abutment body for engagement with a vehicle body.

* * * * *